United States Patent [19]
Fei

[11] Patent Number: 6,114,790
[45] Date of Patent: Sep. 5, 2000

[54] SIXTEEN AND THIRTY TWO SLOT THREE PHASE INDUCTION MOTOR WINDING

[75] Inventor: Renyan W. Fei, St. Louis, Mo.

[73] Assignee: Emerson Electric Co., St. Louis, Mo.

[21] Appl. No.: 09/182,758

[22] Filed: Oct. 29, 1998

[51] Int. Cl.$^7$ ............................ H02K 1/16; H02K 3/04; H02K 3/00; H02K 3/28; H02K 1/12

[52] U.S. Cl. ............................ 310/180; 310/208

[58] Field of Search ............................ 310/42, 180, 184, 310/206, 207, 208; 29/596; 242/432

[56] References Cited

U.S. PATENT DOCUMENTS

| | | | |
|---|---|---|---|
| 4,169,990 | 10/1979 | Lerdman | 318/138 |
| 4,451,751 | 5/1984 | Auinger | 310/184 |
| 5,022,139 | 6/1991 | Jensen | 29/596 |
| 5,898,251 | 4/1999 | Mochizuki et al. | 310/179 |

*Primary Examiner*—Clayton LaBalle
*Attorney, Agent, or Firm*—Doepken Keevican & Weiss

[57] ABSTRACT

An electric motor comprising a stator having sixteen or thirty two slots and three windings asymmetrically arranged in the slots to achieve a substantially balanced three-phase operation.

28 Claims, 5 Drawing Sheets

SIXTEEN AND THIRTY TWO SLOT THREE PHASE INDUCTION MOTOR WINDING

FIELD OF THE INVENTION

This invention relates to three phase motors, and in particular to three phase motors in which the number of winding slots in the stator is not divisible by three.

BACKGROUND OF THE INVENTION

The number of winding slots in the stator of convential three-phase motors is divisible by three so that the windings for each phase can be evenly placed around the circumference of the stator.

As electronic controls are increasingly used in home appliances, there are a growing number of instances where it would be desirable to replace an existing single-phase motor with a three-phase motor. Before the present invention, this would often involve the complete custom redesign of the stator laminations. This custom redesign and manufacture is expensive and time consuming.

SUMMARY OF THE INVENTION

The present invention relates to a three-phase motor having a stator with a number of winding slots that is not divisible by three. The present invention thus allows a three-phase motor to be constructed from some existing single-phase stator cores, laminations without the need to redesign the laminations. It applies to either induction motors or synchronous motors (permanent or reluctance).

More specifically the three-phase motor of the present invention has three windings arranged in the slots so that the three-phase resulting emf vectors are evenly distributed, having the same amplitudes and being spaced 120 electric degrees apart. The coils of each winding are eccentrically arranged in the slots to achieve a substantially balanced three-phase operation.

BRIEF DESCRIPTION OF THE DRAWINGS

FIG. 1A is a winding diagram for the first winding of the three-phase motor;

FIG. 1B is a winding diagram for the second winding of the three-phase motor;

FIG. 1C is a winding diagram for the third winding of the three-phase motor;

FIG. 3A is a winding diagram of the three-phase motor highlighting the first winding;

FIG. 3B is a winding diagram of the three-phase motor highlighting the second winding; and FIG. 3C is a winding diagram of the three-phase motor highlighting the third winding.

Corresponding reference numerals indicate corresponding parts throughout the several views of the drawings.

DETAILED DESCRIPTION OF THE INVENTION

Figure 1A:
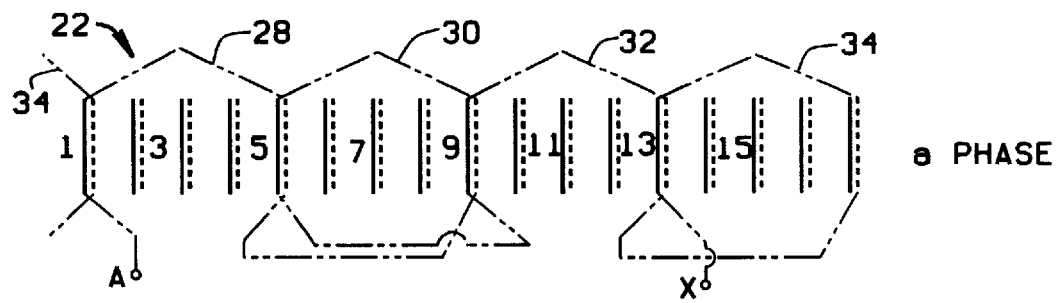
FIGS. 1A, 1B, and 1C illustrate three lap windings of a three-phase motor in a sixteen slot stator core constructed according to the principles of this invention.
Figure 1B:
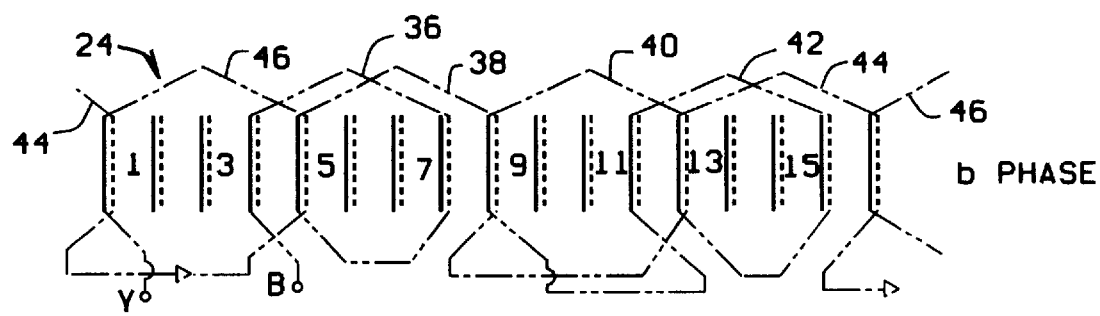
Figure 1C:
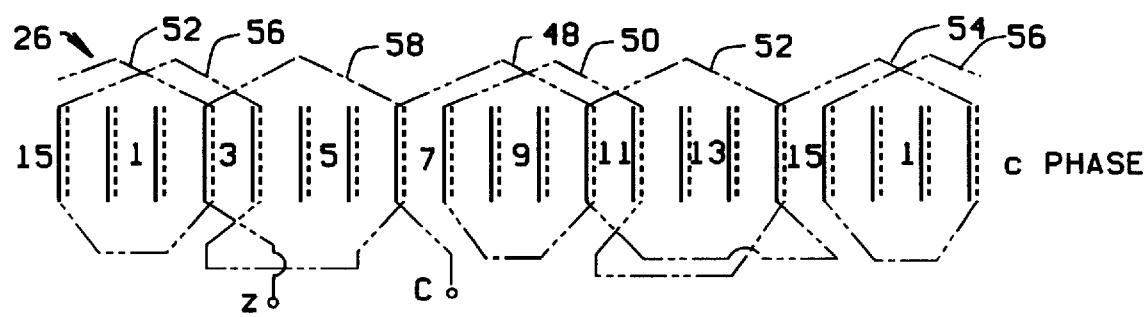

FIGS. 1A–1C show the arrangement of windings for a three-phase motor in a stator 20 having sixteen slots 1 through 16, in accordance with the principles of the present invention. As shown in FIGS. 1A–1C, there are three windings 22, 24, and 26, one for each of the phases. As shown in FIG. 1A, a winding 22 comprises four coils 28, 30, 32, and 34. Coil 28 is wound in a first direction in slots 1 and 5 of the stator 20; coil 30 is wound in a second direction in slots 5 and 9 of the stator; coil 32 is wound in the first direction in slots 9 and 13 of the stator, and coil 34 is wound in the second direction in slots 13 and 1. As shown in FIG. 1B, winding 24 comprises six coils 36, 38, 40, 42, 44, and 46. Coil 36 is wound in the first direction in slots 3 and 7 in the stator 20, coil 38 is wound in the first direction in slots 4 and 8 in the stator, coil 40 is wound in the second direction in slots 8–12 in the stator, coil 42 is wound in the first direction in slots 11 and 15 in the stator, coil 44 is wound in the first direction in slots 12 and 16 in the stator, coil 46 is wound in the second direction in slots 16 and 4 in the stator. As shown in FIG. 1C, winding 26 comprises coils 48, 50, 52, 54, 56, and 58. The coil 48 is wound in the first direction in slots 6 and 10 in the stator; the coil 50 is wound in the first direction in slots 7 and 11 of the stator; the coil 52 is wound in the second direction in slots 10 and 14 of the stator; the coil 54 is wound in the first direction in slots 14 and 2 in the stator; the coil 56 is wound in the first direction in slots 15 and 3 in the stator; the coil 58 is wound in the second direction in slots 2 and 6.

The slot 1 has coil 28 and coil 34; the slot 2 has coil 52 and coil 58; the slot 3 has coil 36 and coil 56; the slot 4 has coil 38 and coil 46; the slot 5 has coil 28 and coil 30; the slot 6 has coil 48 and coil 58; the slot 7 has coil 36 and coil 50; the slot 8 has coil 38 and coil 40; the slot 9 has coil 30 and coil 32; the slot 10 has coil 48 and coil 52; the slot 11 has coil 42 and coil 50; the slot 12 has coil 40 and coil 44; the slot 13 has coil 32 and coil 34; the lot 14 has coil 52 and coil 54; the slot 15 has coil 42 and coil 56; nd the slot 16 has coil 44 and coil 46.

In this preferred embodiment, all of the wires are the same size, the number of turns in each coil is as follows: coil 28—80; coil 30—80; coil 32—80; coil 34—80; coil 36—56; coil 38—56; coil 40—56; coil 42—56; coil 44—56; coil 46—56; coil 48—56; coil 50—56; coil 52—56; coil 54—56; coil 56—56; and coil 58—56.

Figure 2A:
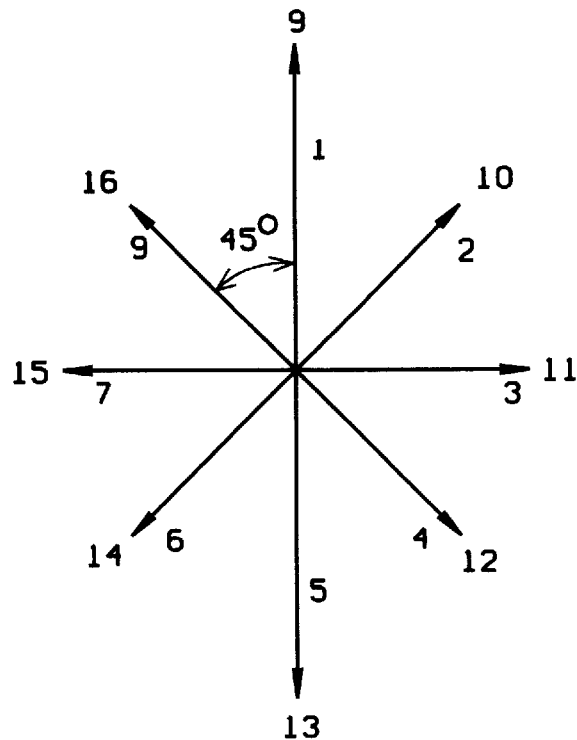
FIG. 2A is a vector diagram of the winding emf phasors from all coils.
Figure 2B:
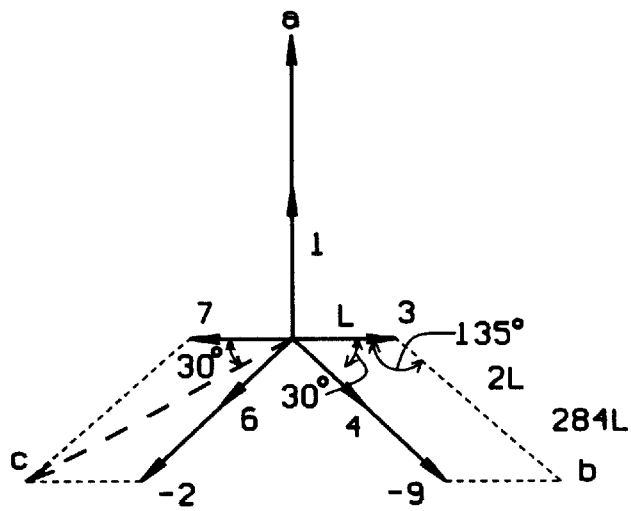
FIG. 2B is a vector diagram of the winding emf phasors grouped in three phases.

The result of the eccentric lap winding is a substantially uniform three-phase operation. As illustrated in FIG. 2B, the emfs developed in the first 360 electrical degree achieve a substantially balanced three-phase operation. The same applies to the second 360 electrical degrees. Slots 1, 5, 9, and 13, have about 40% more turns than the other slots. These four slots are arranged at four corners of the square laminations so that they can have more slot area than the other slots without increasing the amount of lamination material. Because of this arrangement, the new winding configuration of the present invention results in less material cost than a conventional winding with round laminations for the same power rating.

Figure 3A:
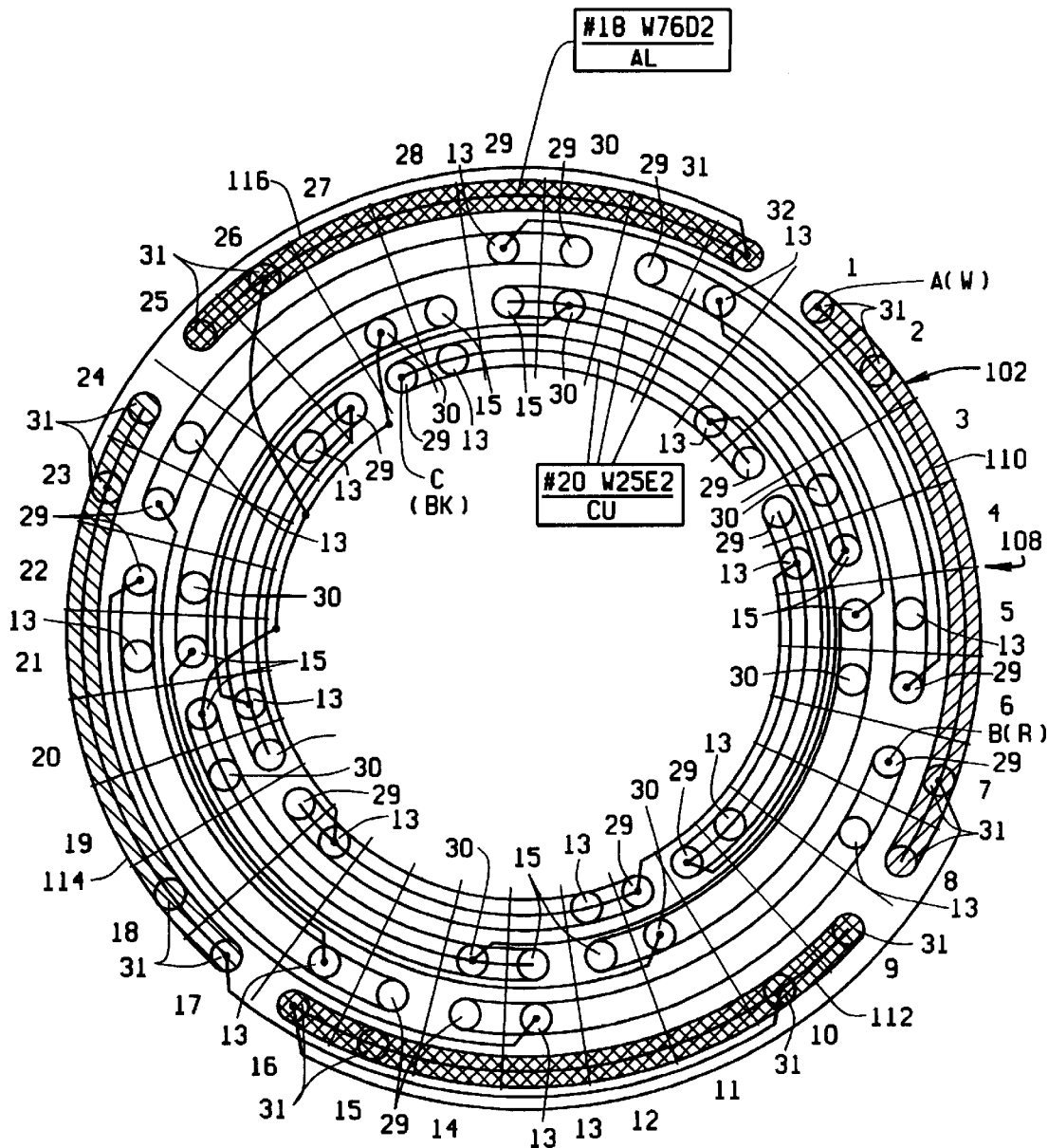
FIGS. 3A, 3B, and 3C illustrate three concentric windings of a three phase motor in a thirty-two slot stator core constructed according to the principles of this invention.
Figure 3B:
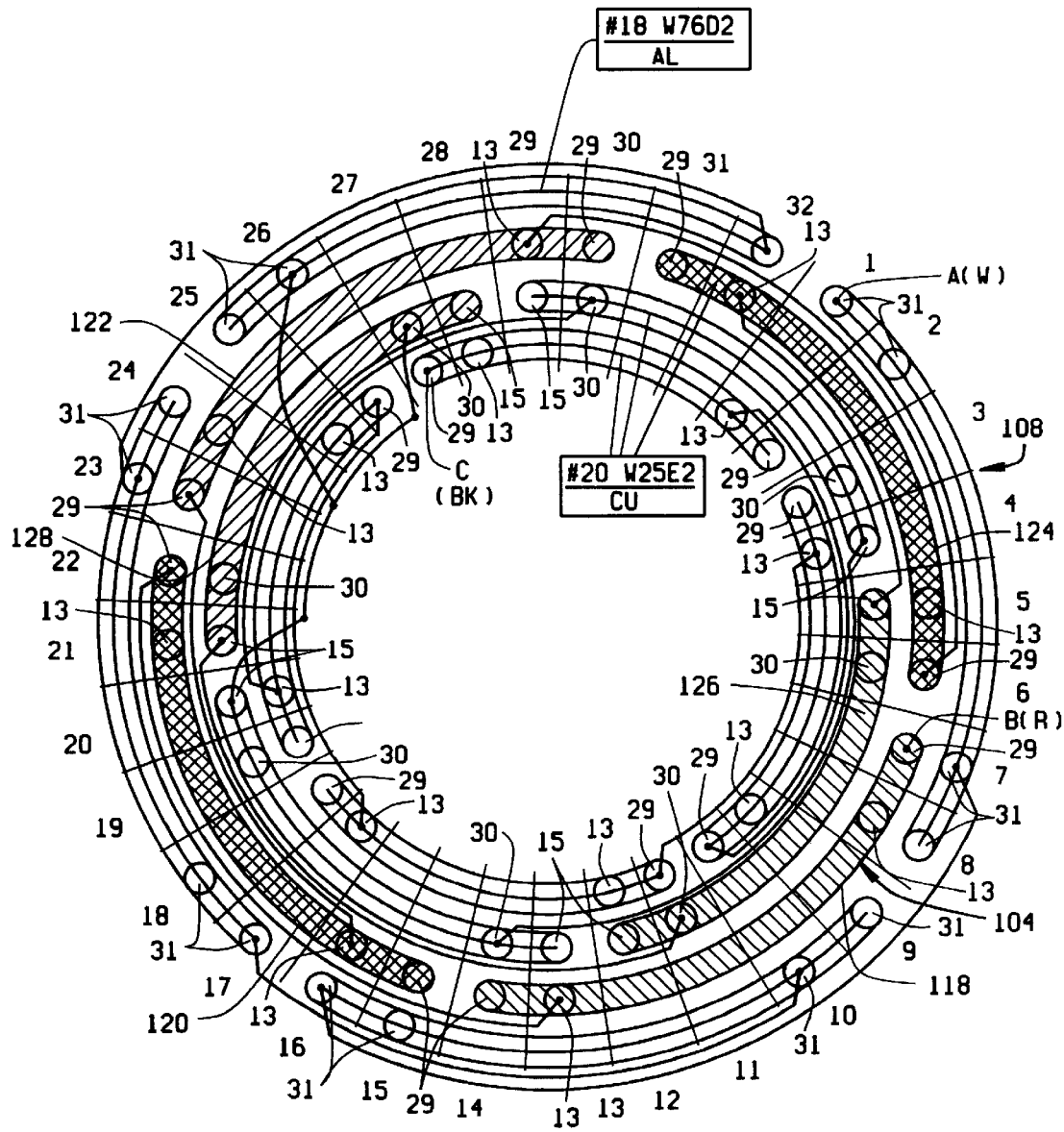
Figure 3C:
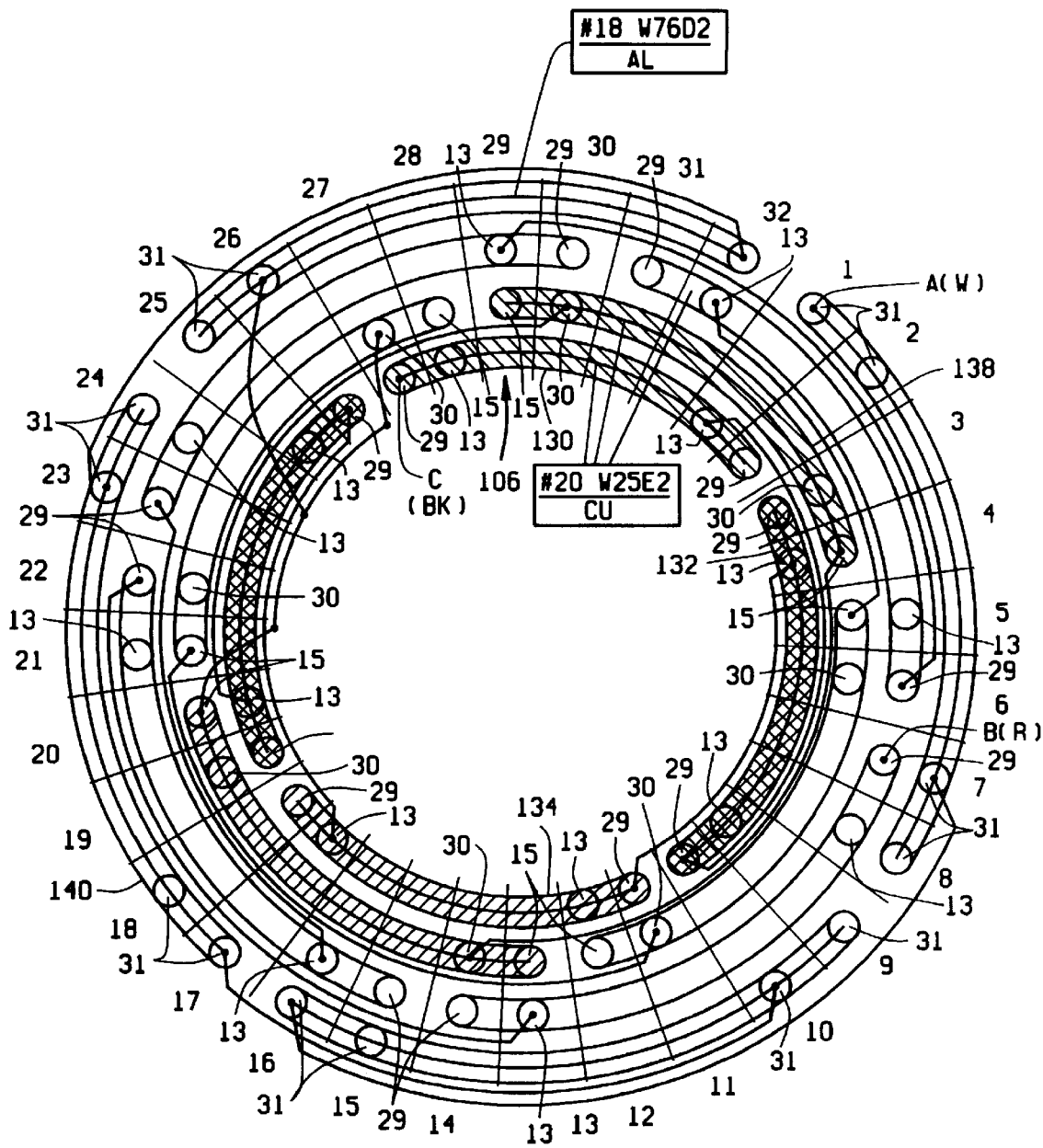

FIG. 3 shows the arrangement of three concentric windings 102, 104, and 106 in a three-phase motor in a 32 slot stator core 108 in accordance with the principles of the present invention. The winding 102 comprises coil 110, spanning slots 1 to 8 and 2 to 7, wound in a first direction; coil 112, spanning slots 9 to 16 and 10 to 15, wound in a second direction; coil 114, spanning slots 17 to 24 and 18 to 23, wound in the first direction; and coil 116, spanning slots 25 to 32 and 26 to 31, wound in the second direction. The winding 104 comprises coil 118, spanning slots 7 to 14 and 8 to 13, wound in the first direction; coil 120, spanning slots 15 to 22 and 16 to 21, wound in the second direction; coil 122, spanning slots 23 to 30 and 24 to 29, wound in the first direction; coil 124, spanning slots spanning slots 31 to 6 and 32 to 5, wound in the second direction; coil 126, spanning slots 5 to 12 and 6 to 11, wound in the first direction; and coil 128, spanning slots 21 to 28 and 22 to 27, wound in the first direction. The winding 106 comprises coil 130, spanning slots 27 to 2 and 28 to 1, wound in the first direction; a coil 132, spanning slots 3 to 10 and 4 to 9, wound in the second direction; coil 134, spanning slots 11 to 18 and 12 to 17, wound in the first direction; coil 136, spanning slots 19 to 26 and 20 to 25, wound in the second direction; coil 138, spanning slots 29 to 4 and 30 to 3, wound in the first direction; and coil 140, spanning slots 13 to 20 and 14 to 19, wound in the first direction.

In this preferred embodiment the number of turns in each coil, from inside to outside, is as follows: coil 110—31 and 31; coil 112—31 and 31; coil 114—31 and 31; coil 116—31 and 31; coil 118—13 and 29; coil 120—13 and 29; coil 122—13 and 29; coil 124—13 and 29; coil 126 30 and 15; coil 128 30 and 15; coil 130—13 and 29; coil 132—13 and 29; coil 134 13 and 29; coil 136—13 and 29; coil 138—30 and 15; and coil 140—30 and 15.

Each coil of winding 102 has about 40% more effective turns that the coils in windings 104 and 106, it is preferably made of aluminum wire, while windings 104 and 106 are made of copper wire. As in the sixteen slot laminations in the first embodiment, the slots at the four corners of the 32 slot square laminations, i.e., slots 31-32-1-2, 7-8-9-10, 15-16-17-18, and 23-24-25-26 have more slot area than the other slots. As a result, the slot fill in all the slots is almost the same. The material cost of this new motor is lower than that of traditional round lamination motors of the same power rating.

The result of the eccentric concentric winding is a substantially uniform three-phase operation, in a stator with a number of winding slots that is not divisible by three.

What is claimed:

1. In a four pole motor having a stator with a plurality of slots arranged asymmetrically relative to three-phase operation; a plurality of asymmetric windings arranged to provide a balanced three-phased operation.

2. The four-pole motor according to claim 1 wherein the windings substantially evenly fill the slots.

3. The motor according to claim 1 wherein the stator comprises a substantially square stack of laminations with sixteen slots therein, with twelve of the slots being substantially equal in size, and four of the slots, equally spaced from each other, being larger than the other twelve slots.

4. The motor according to claim 3 wherein the four larger slots are positioned in the corners of the square lamination.

5. The four-pole motor according to claim 1 wherein the stator comprises a substantially square stack of laminations with thirty two slots therein, with twenty-four of the slots being substantially equal in size, and eight of the slots, arranged in four pairs equally spaced from each other, being larger than the other twenty-four slots.

6. The four-pole motor according to claim 5 wherein the pairs of larger slots are positioned in the corners of the square lamination.

7. In a four pole motor having a stator with sixteen slots arranged asymmetrically relative to three-phase operation, a plurality of asymmetric windings arranged to provide a balanced three-phase operation.

8. The motor according to claim 7 wherein the plurality of asymmetric windings comprises a first winding comprising four coils; a second winding comprising six coils, and a third winding comprising six coils, the coils arranged asymmetrically in the slots to form four poles of a three-phase motor.

9. The motor according to claim 7 wherein there are three windings arranged asymmetrically in the slots.

10. The four-pole motor according to claim 7 wherein the windings substantially evenly fill the slots.

11. The motor according to claim 7 wherein there is a first winding for the first phase, a second winding for the second phase, and a third winding for the third phase;

the first winding comprising first, second, third and fourth coils, the first coil wound in a first direction in slots 1 and 5 of the stator, the second coil wound in a second direction in slots 5 and 9 of the stator; the third coil wound in the first direction in slots 9 and 13 of the stator, and the fourth coil wound in the second direction in slots 13 and 1;

the second winding comprising first, second, third, fourth, fifth, and sixth coils, the first coil wound in the first direction in slots 3 and 7 in the stator, the second coil wound in the first direction in slots 4 and 8 in the stator, the third coil wound in the second direction in slots 8 and 12 in the stator, the fourth coil wound in the first direction in slots 11 and 15 in the stator, the fifth coil wound in the first direction in slots 12 and 16 in the stator, and the sixth coil wound in the second direction in slots 16 and 4 in the stator; and the third winding comprising first, second, third, fourth, fifth, and sixth coils, the first coil wound in the first direction in slots 6 and 10 in the stator; the second coil wound in the first direction in slots 7 and 11 of the stator; the third coil wound in the second direction in slots 10 and 14 of the stator; the fourth coil wound in the first direction in slots 14 and 2 in the stator; the fifth coil wound in the first direction in slots 15 and 3 in the stator; and the sixth coil wound in the second direction in slots 2 and 6.

12. The motor according to claim 7 wherein the windings are arranged in the slots so that twelve of the slots have substantially the same number of wires, and four of the slots have a greater number of wires, these four slots with a greater number of wires being equally spaced from each other.

13. In a motor having a stator with thirty-two slots arranged asymmetrically relative to three-phase operation, a plurality of asymmetric windings arranged to provide a balanced three-phase operation.

14. The motor according to claim 13 wherein the plurality of asymmetric windings comprises a first winding comprising four coils; a second winding comprising six coils, and a third winding comprising six coils, the coils arranged asymmetrically in the slots to form four poles of a three-phase motor.

15. The electric motor according to claim 14 wherein the three windings comprise a first windings having four coil sections disposed in the slots, a second winding having six coil sections disposed in the slots, and a third coil section having six coil sections disposed in the slots.

16. The motor according to claim 13 wherein there are three windings arranged asymmetrically in the slots.

17. The motor according to claim 13 wherein the windings substantially evenly fill the slots.

18. The motor according to claim 13 wherein there is a first winding for the first phase, a second winding for the second phase, and a third winding for the third phase;

the first winding comprising a first, second, third, and fourth coils, the fist coil spanning slots 1 to 8 and 2 to 7, wound in a first direction; the second coil spanning slots 9 to 16 and 10 to 15, wound in a second direction; the third coil spanning slots 17 to 24 and 18 to 23, wound in the first direction; and the fourth coil spanning slots 25 to 32 and 26 to 31, wound in the second direction;

the second winding comprising first, second, third, fourth, fifth and sixth coils, the first coil spanning slots 7 to 14 and 8 to 13, wound in the first direction; the second coil spanning slots 15 to 22 and 16 to 21, wound in the second direction; the third coil spanning slots 23 to 30 and 24 to 29, wound in the first direction; the fourth coil spanning slots spanning slots 31 to 6 and 32 to 5, wound in the second direction; the fifth coil spanning slots 5 to 12 and 6 to 11, wound in the first direction; and the sixth coil spanning slots 21 to 28 and 22 to 27, wound in the first direction;

the third winding comprising first, second, third, fourth, fifth, and sixth coils, the first coil spanning slots 27 to 2 and 28 to 1, wound in the first direction; the second coil spanning slots 3 to 10 and 4 to 9, wound in the second direction; the third coil spanning slots 11 to 18 and 12 to 17, wound in the first direction; the fourth coil spanning slots 19 to 26 and 20 to 25, wound in the second direction; the fifth coil 138 spanning slots 29 to 4 and 30 to 3, wound in the first direction; and the sixth coil spanning slots 13 to 20 and 14 to 19, wound in the first direction.

19. The motor according to claim 5 wherein the windings are arranged in the slots so that twenty four of the slots have substantially the same number of wires, and eight of the slots have a greater number of wires, these eight slots with a greater number of wires being arranged in four pairs equally spaced from other.

20. A four-pole electric motor comprising a stator with a plurality of slots arranged asymmetrically with respect to symmetric three-phase operation, and three windings asymmetrically arranged in the slots to achieve a substantially balanced three-phase operation.

21. The four-pole electric motor according to claim 20 wherein the windings substantially evenly fill the slots.

22. A four-pole electric motor comprising a stator having sixteen slots and three windings asymmetrically arranged in the slots to achieve a substantially balanced three-phase operation.

23. The four-pole electric motor according to claim 22 wherein the windings substantially evenly fill the slots.

24. An electric motor comprising a stator having thirty-two slots and three windings asymmetrically arranged in the slots to achieve a substantially balanced three-phase operation.

25. The electric motor according to claim 24 wherein the windings substantially evenly fill the slots.

26. In a motor having a stator with a plurality of slots arranged asymmetrically relative to three-phase operation; a plurality of asymmetric windings substantially evenly filling the slots, with the windings arranged to provide a balanced three-phased operation.

27. The motor according to claim 26 wherein the windings comprise at least two different materials providing the same conductivity with different cross sectional areas for providing substantially even filling of the slots.

28. The motor according to claim 27 wherein the winding material is a metal selected from the group consisting of copper and aluminum.

* * * * *